J. ANDERSON.

Improvement in Railroad-Car Springs.

No. 127,672. Patented June 11, 1872.

Witnesses:
W. M. Dobbins
Gus. Sydie

Inventor:
Jas Anderson 127,672

UNITED STATES PATENT OFFICE.

JAMES ANDERSON, OF NEW YORK, N. Y.

IMPROVEMENT IN CAR-SPRINGS.

Specification forming part of Letters Patent No. 127,672, dated June 11, 1872.

*To all whom it may concern:*

Be it known that I, JAMES ANDERSON, of the city, county, and State of New York, have invented a new and useful Improvement in Railway Car-Springs, of which the following is a specification, reference being had to the accompanying drawing forming part thereof.

Figure 4:
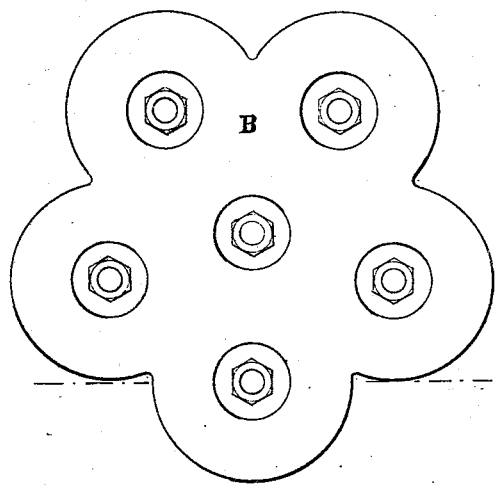
Figure 3:
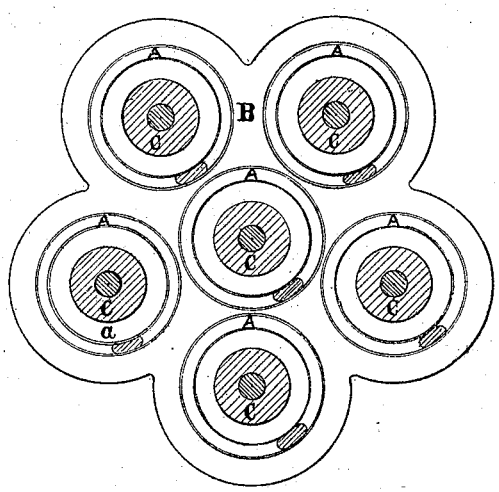
Figure 2:
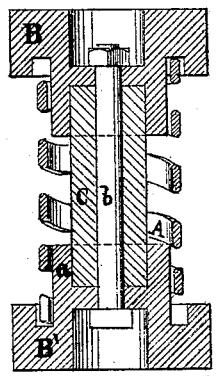
Figure 1:
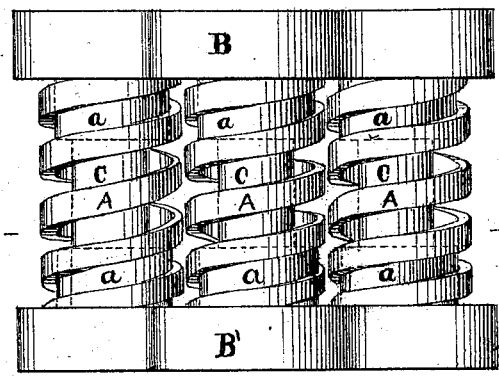

Figure 1 is an elevation of my combined group of car-springs. Fig. 2 is a vertical sectional view of one of the combined springs, detached from the group. Fig. 3 is a horizontal sectional view of the group, cut through on one of the dotted lines $x$ or $y$. Fig. 4 is an outer face view of one of the caps that inclose the springs forming the group.

My invention relates to a combination of several steel spiral and rubber springs, put together in a group, to form a railway car-spring, the whole being inclosed between a suitable cast-iron cup and base, in each of which are cast short hollow columns or sockets to receive the ends of the rubber springs, and upon which the spiral springs surrounding the upper are at either end supported and held in position.

A indicates a series of steel spiral springs of the ordinary construction. In this series there are six such springs shown grouped together, one in the center and five surrounding it. B and B' represent cast-iron caps, made to receive and hold the said springs, and provide bearings for the top and bottom of the group. C represents a series of vulcanized rubber springs made in a cylindrical form. Upon the inner face of each of the said caps is cast a series of cylindrical projections, $a$, each of which is recessed to receive an end of one of the rubber springs C. The projections are made to fit fairly into the ends of the spiral springs, so as to hold them (the latter) steadily in the group, and their length, respectively, equals one-fourth to one-third that of the spiral springs. The recesses in the projections for the reception of the columns of rubber C may be made only of sufficient depth to hold securely the ends of the rubber, thus admitting of the use of rubber springs considerably shorter than the spirals, whereby less rubber is required to get the same bearing power than when rubber columns are used of the full length of the spirals; or, the said recesses may be made deeper, and the rubber columns of such length that they will not bottom in them until the pressure upon the group has compressed to some extent the spiral springs, whereby the spirals in action will at the outset alone sustain the load placed upon them, and only when the pressure is increased will the rubber be brought into action, thus augmenting the bearing power of the combined group when such increase of bearing power is needed. The caps may be secured together by screw-bolts $b$, one of which passes through each of the spirals, and through an aperture through the center of the rubber, the heads and nuts of the bolts being recessed at top and bottom into the outer faces of the caps, as shown in the drawing.

The combination here described constitutes an exceedingly cheap, convenient, compact, durable car-spring of admirable action and great power.

I do not claim broadly the grouping together of either steel spiral springs or rubber springs, or both, to form a single car-spring; nor do I claim broadly the spiral springs placed and held in a group upon projections made on the inner faces of the caps B, or their equivalents; nor yet do I claim the spiral springs A combined with the rubber columns C, placed within the spiral, whether alone or grouped together; intending to limit myself to the entire combination of the series of rubber columns C, and spiral springs A with the caps B, and the recessed projections $a$, the said springs surrounding the rubber, and being retained in position in the group upon the said projections, and the rubber being held at either end in the recesses of the said projections.

What I do claim, and desire to secure by Letters Patent, is—

A railway car-spring, composed of a series of spiral springs, A, the caps B having upon their inner faces projections $a$, that are recessed interiorly, and the rubber columns C, all being grouped together, combined and operating substantially as and for the purpose specified.

JAS. ANDERSON.

Witnesses:
THADDEUS J. MCCARTHY,
ROBERT P. HARLOW.